United States Patent
Pombo

(10) Patent No.: US 11,137,611 B2
(45) Date of Patent: Oct. 5, 2021

(54) HEAD MOUNTED DISPLAY MOUNTING ASSEMBLY

(71) Applicant: RealWear, Inc., Vancouver, WA (US)

(72) Inventor: Stephen A. Pombo, Campbell, CA (US)

(73) Assignee: REALWEAR, INC., Vancouver, WA (US)

(*) Notice: Subject to any disclaimer, the term of this patent is extended or adjusted under 35 U.S.C. 154(b) by 0 days.

(21) Appl. No.: 16/297,002

(22) Filed: Mar. 8, 2019

(65) Prior Publication Data
US 2019/0377190 A1 Dec. 12, 2019

Related U.S. Application Data

(63) Continuation-in-part of application No. 16/004,030, filed on Jun. 8, 2018, now Pat. No. 10,774,986.

(51) Int. Cl.
*G02B 27/01* (2006.01)
(52) U.S. Cl.
CPC ................ *G02B 27/0176* (2013.01)
(58) Field of Classification Search
CPC ........... A42B 1/247; A42B 1/24; A42B 1/241; A42B 1/242; A42B 1/244; A42B 1/248; A42B 3/04; A42B 3/0406; A42B 1/061; A42B 1/062; A42B 1/245; A45F 2200/0541; A45F 5/02; Y10T 24/1385; F16M 13/04
USPC ........................................................ 224/181
See application file for complete search history.

(56) References Cited

U.S. PATENT DOCUMENTS

| 3,797,041 | A | | 3/1974 | Raschke |
| 5,052,054 | A | * | 10/1991 | Birum ................... A42B 1/061 2/10 |
| 5,796,374 | A | | 8/1998 | Cone et al. |
| 5,806,101 | A | | 9/1998 | Thurwanger et al. |
| 6,041,435 | A | | 3/2000 | Paulson et al. |

(Continued)

FOREIGN PATENT DOCUMENTS

| CN | 206365527 U | 12/2016 |
| WO | 2017124105 A1 | 7/2017 |

OTHER PUBLICATIONS

International Search Report and Written Opinion dated Aug. 23, 2019 in International Patent Application No. PCT/US19/35599, 13 pages.

(Continued)

*Primary Examiner* — Nathan J Newhouse
*Assistant Examiner* — Matthew T. Theis
(74) *Attorney, Agent, or Firm* — Shook, Hardy & Bacon, L.L.P.

(57) ABSTRACT

A head mounted display mounting assembly for casual headwear is provided. The assembly comprises a resilient support band that is employed to secure a head-mounted display unit to a piece of casual headwear worn by a user. The head mounted display mounting assembly can be supported by pre-existing structures (e.g., sweat band) of a piece of casual headwear, and further supported and/or secured to temple regions of the casual headwear. Once seated within and secured to the piece of casual headwear, the head-mounted display unit can be secured to the head mounted display mounting assembly, providing a comfortable and integrated wearable experience for the user.

11 Claims, 12 Drawing Sheets

(56) References Cited

U.S. PATENT DOCUMENTS

| | | |
|---|---|---|
| 7,543,932 B1 | 6/2009 | Isabelle et al. |
| 8,250,669 B2 | 8/2012 | Gafforio et al. |
| 8,286,269 B2 | 10/2012 | Springer et al. |
| 2002/0131616 A1* | 9/2002 | Bronnikov ............ H04R 1/083 381/370 |
| 2002/0186180 A1 | 12/2002 | Duda |
| 2010/0154093 A1* | 6/2010 | Provost ................. A42B 3/185 2/10 |

OTHER PUBLICATIONS

Non-Final Office Action dated Dec. 12, 2019 in U.S. Appl. No. 16/004,030, 10 pages.
Notice of Allowance dated Jun. 9, 2020 in U.S. Appl. No. 16/004,030, 5 pages.
International Preliminary Report on Patentability received for PCT Application No. PCT/US2019/035599, dated Dec. 17, 2020, 7 pages.

* cited by examiner

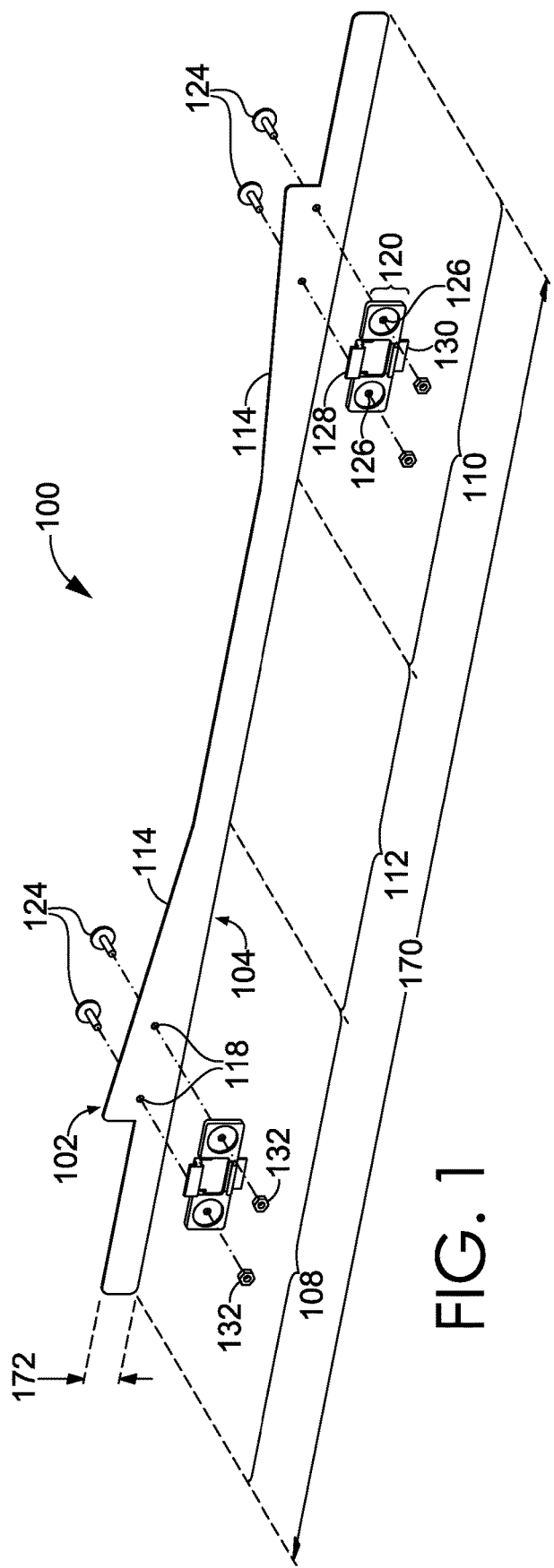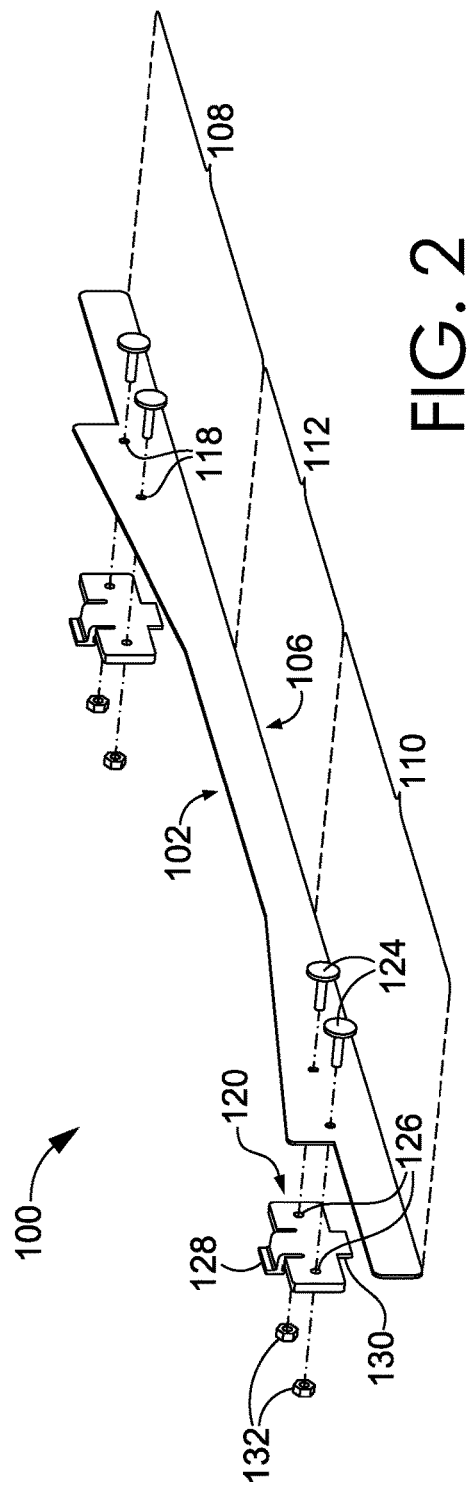

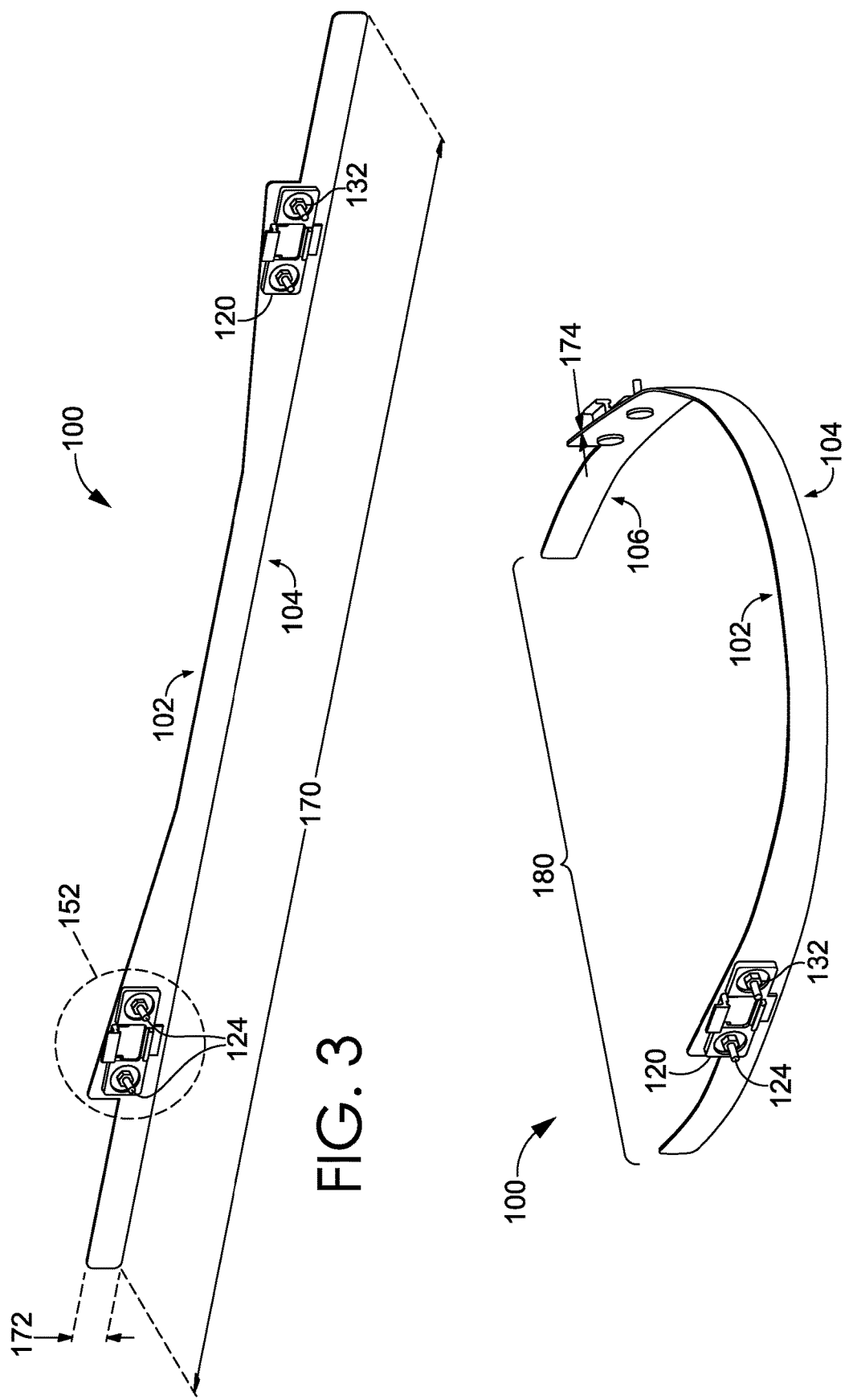

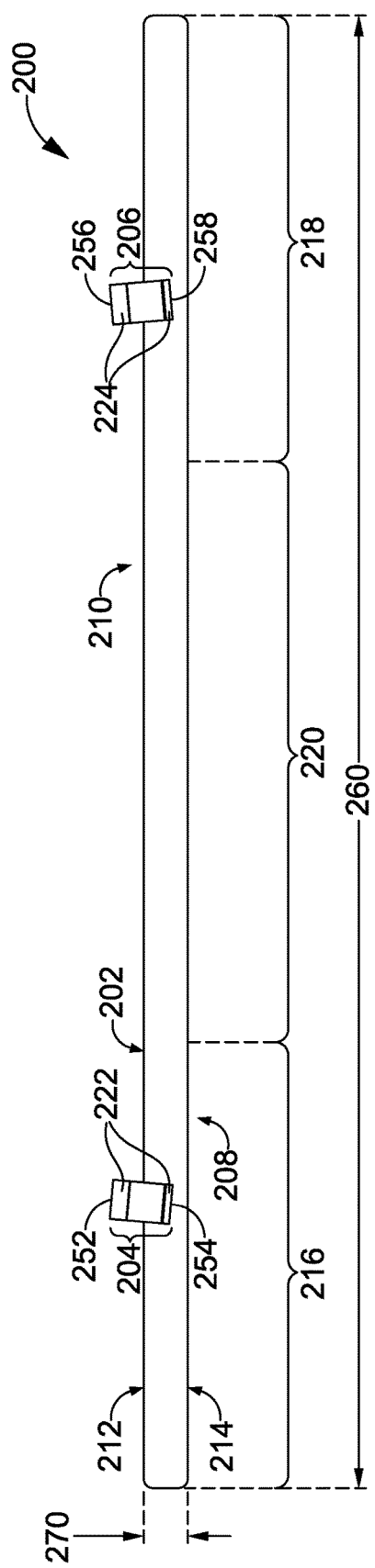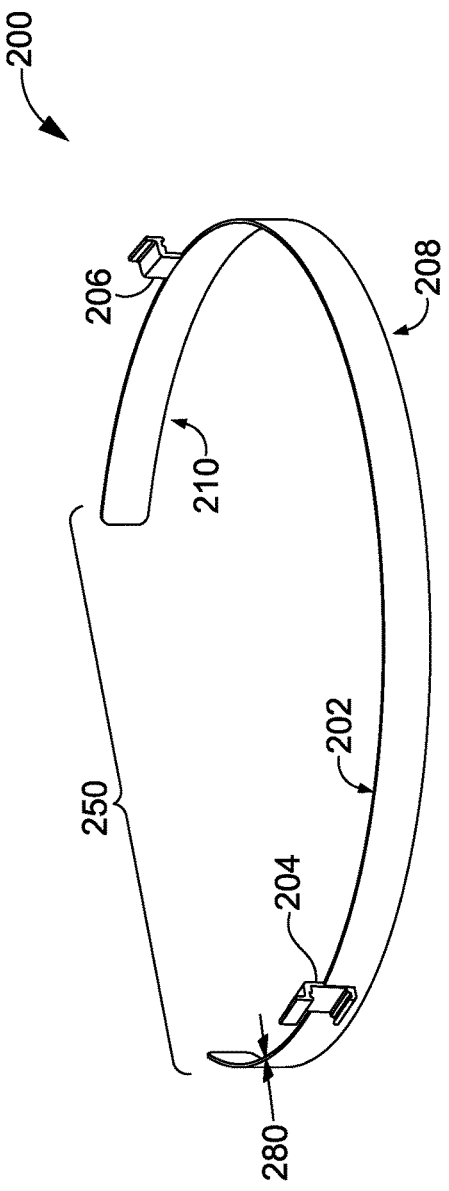

HEAD MOUNTED DISPLAY MOUNTING ASSEMBLY

CROSS REFERENCE TO RELATED APPLICATIONS

This application, entitled "Head Mounted Display Mounting Assembly," is a continuation-in-part of prior U.S. application Ser. No. 16/004,030, filed Jun. 8, 2018, entitled "Head Mounted Display Mounting Assembly," the entirety of which is incorporated herein by reference.

BACKGROUND

Head-mounted display units allow users to mount mobile computing devices on or around their head, enabling the user to transport and utilize advanced technologies with greater ease and flexibility. Head-mounted display units also enable a user to have interaction with the technology while otherwise remaining engaged in other tasks. For instance, head-mounted display units can be voice activated and hands-free, so that users are able to focus on other more "physical" tasks, or simply desire a more hands-free computing experience. However, head mounted display units have been traditionally limited to being used in conjunction with a limited number of headwear form-factors. In some instances, head mounted display units can be designed for securement to pre-existing fastener elements found on headwear, such as those typically found on hard hats. In the alternative, elastic straps may be employed to secure the head mounted display unit to the user's head, though some may find these straps to be unappealing. Additionally, headwear utilized for head mounted display units do not always provide users with an intuitive, natural, and comfortable fit. Therefore, a head mounted display mounting assembly that can safely secure the head-mounted display unit to alternative types of headwear, in addition to conventional form-factors, would be beneficial.

BRIEF DESCRIPTION OF THE DRAWINGS

Examples of the present invention are described in detail below with reference to the attached drawing figures, wherein:

FIG. 1 depicts a perspective view of an exemplary head mounted display mounting assembly, in accordance with aspects herein;

FIG. 2 depicts a an alternate perspective view of the exemplary head mounted display mounting assembly of FIG. 1, in accordance with aspects herein;

FIG. 3 depicts an alternate perspective view of the exemplary head mounted display mounting assembly of FIG. 1 in which the components of the mounting assembly are removably secured together, in accordance with aspects herein;

FIG. 4 depicts an alternate perspective view of the exemplary head mounted display mounting assembly of FIG. 3 in which a resilient support band is flexed into a semi-circular configuration, in accordance with aspects herein;

FIG. 7 depicts an alternate exemplary head mounted display mounting assembly, in accordance with aspects herein;

FIG. 8 depicts the alternate exemplary head mounted display mounting assembly of FIG. 7 wherein the resilient support band is flexed into a semi-circular configuration, in accordance with aspects herein;

DETAILED DESCRIPTION

Figure 5:
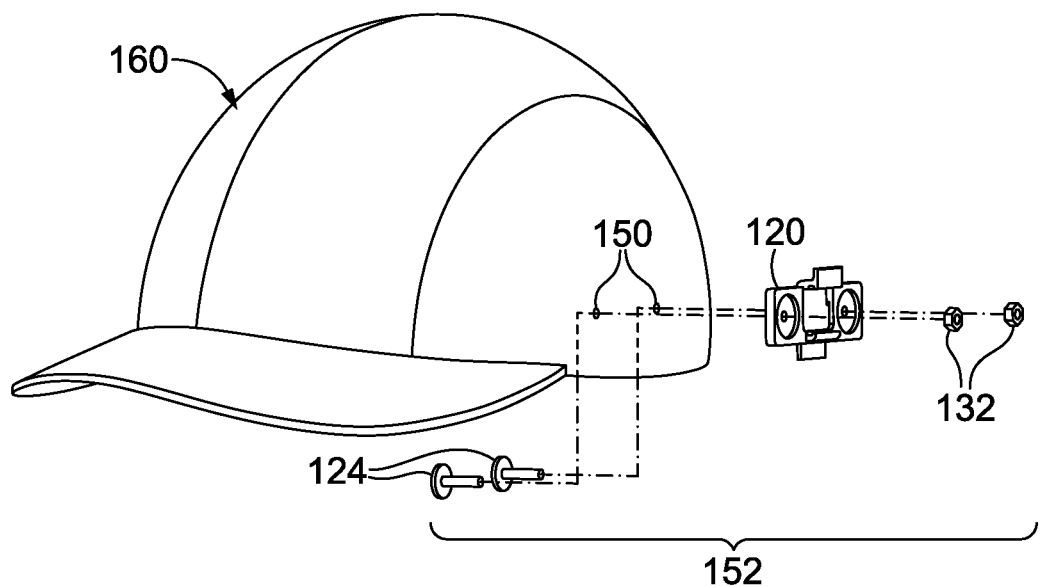
FIG. 5 depicts an exemplary casual headwear piece and components of the head mounted display mounting assembly of FIG. 1, in accordance with aspects herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Head-mounted display units (HMDUs), such as the HMT-1 developed by RealWear, Inc. of San Jose, Calif., have been developed to promote the ability to work and communicate in a hands-free fashion. The ability to easily and safely utilize head-mounted display units in the field while taking part in various physical activities is important for individuals that need to utilize HMDUs to perform their work. For example, a construction engineer who is on site typically needs to carry materials, such as blueprints, manuals, communication devices, or other items, while performing their duties. These items can be cumbersome, decrease efficiency, and increase the risk of accidents on site. The use of HMDUs in the field can help decrease such risk. Currently, individuals can mount HMDUs to wearable articles, such as protective wear (e.g., a hard hat or a bump cap), enabling workers to have instant access to electronic copies of documents (e.g., blueprints and manuals), communicate with others, or even communicate with the device provided that the device is voice-operable. This can enable an individual to work more safely and efficiently in the field.

However, because there are only a limited number of headwear form-factors that HDMUs can be safely secured to, they are not being utilized as widely or as effectively as possible. Generally, the use of head-mounted display units has been limited to headwear or some other wearable form-factor having mounting attachments that facilitate the securement of the head mounted display unit. Therefore, there is a need for a head mounted display mounting assembly that can be utilized with different types of headwear, facilitating a safe and strong removable securement of a head mounted display unit while maintaining the general aesthetics of the headwear. A head mounted display mounting assembly that is configured to be used in a variety of headwear, including causal headwear, would enable greater flexibility regarding the type of headwear worn while utilizing the head mounted display unit. The flexibility facilitated by the described head mounted display mounting assembly will enable a broader range of users in various industries to utilize head mounted display units, and may also provide more comfortable headwear options to use with the head mounted display units.

At a high level, embodiments of the present invention are generally directed to a head mounted display mounting assembly (HMDMA) for casual headwear that is adapted to receive the assembly and comprises a resilient support that is employed to secure a head-mounted display unit ("HMDU") to a piece of casual headwear worn by a user. Headwear worn by the user can include, among other things, a baseball hat, helmet, a bump cap, a visor, a stocking cap, an elastic band or tri-band, or any other form-factor of headwear that can be worn on the head of a user. In this regard, it is contemplated that the HMDU is not necessarily limited to a head-mounted display, but a mobile computing device that can generally be worn on the head of the user. Embodiments of the present technology address the challenge of utilizing a HMDU while restricting the HMDU movement and providing strong securement for maximized utility and safety of the HMDU. Various embodiments described herein are directed to a head mounted display mounting assembly that can be inserted into various types of casual headwear for removable securement of a HMDU. Such embodiments can provide a seamless and integrated wearable experience, while maintaining aesthetic purity and security generally offered by headwear form-factors typically employed for HDMU use. The described head mounted display mounting assembly is configured to be integrated into headwear form-factors not typically employed for securement of an HDMU, such as a baseball hat, providing alternative options outside of the realm of specialized headwear (e.g., mounting clips secured to a hard hat). The use of such a head mounted display mounting assembly can facilitate broader use cases and environments for users of HDMUs, as the embodiments described herein can enable securement of a HDMU to a variety of more casual and non-conventional headwear form factors.

In accordance with aspects herein, the head-mounted display mounting assembly for casual headwear comprises a resilient support band, a first mounting element and a second mounting element. The resilient support band has an elongate shape that presents a first face and a second face opposite the first face, the elongate shape including a top, a bottom opposite the top, a first portion and a second portion extending in opposing directions away from a central portion of the resilient support band. The first mounting element is secured to the first portion of the elongate shape and presents a first set of mounting fasteners that extend transversely away from the first face. The second mounting element is secured to the second portion of the elongate shape and presents a second set of mounting fasteners that extend transversely away from the first face. The resilient support band is adapted to be flexed into a semi-circular configuration for insertion into an interior pocket of a casual headwear piece such that each of the first and second set of mounting fasteners protrudes through a respective opening presented on a respective temple region of the causal headwear piece. The resilient support band, once inserted, is further adapted to removably secure a head mounted display unit to the casual headwear piece via the protruding first and second sets of mounting fasteners.

In some further embodiments, the HMDMA for casual headwear comprises a resilient support band and a pair of mounting elements comprising a mounting plate, a set of mounting plate fasteners, and a set of mounting plate nuts. In this embodiment, the resilient support band has an elongate shape that presents a first face and a second face opposite the first face, the elongate shape having a first portion and a second portion extending in opposing directions away from a central portion of the resilient support band. Each of the first and second portions have a corresponding collar protrusion that presents a first set of holes aligned at a respective angle away from the central portion of the resilient support band. The mounting plates present a second set of holes that correspond to either of the presented first set of holes. The resilient support band can be adapted to be flexed into a semi-circular configuration for insertion into an interior pocket of a casual headwear piece such that the first set of holes, for each of the first and second portions, are positioned at a respective temple region of the casual headwear piece. Further, the pair of mounting plates can be adapted to be secured to both the casual headwear piece and the resilient support band when the sets of mounting plate fasteners are inserted through the presented first sets of holes, then through a material of the casual headwear piece, and secured to the mounting plates. The secured pair of mounting plates are further adapted to removably secure a HMDU to the casual headwear piece.

In additional embodiments, the HMDMA for casual headwear comprises a resilient support band, a first mounting element and a second mounting element. The resilient support band has an elongate shape that presents a first face and a second face opposite the first face, the elongate shape including a top, a bottom opposite the top, a first portion and a second portion extending in opposing directions away from a central portion of the resilient support band. Additionally, the resilient support band comprises a first mounting protrusion extending away from the top of the first portion of the resilient support band and a second mounting protrusion extending away from the top of the second portion of the resilient support band. The first mounting element comprises a first set of mounting fasteners that removably secure the first mounting element to the resilient support band at the first mounting protrusion. The second mounting element comprises a second set of mounting fasteners that removably secure the second mounting element to the resilient support band at the second mounting protrusion. Additionally, the first and second mounting elements comprise a first set of head mounted display mounting clips and a second set of head mounted display mounting clips that extend transversely away from the first face of the resilient support band. The resilient support band is adapted to be flexed into a semi-circular configuration for insertion into a pocket of a casual headwear piece and the first mounting element and second mounting element are receivable by the pocket after the resilient support band is inserted into the pocket of the causal headwear piece such that the first set of mounting fasteners and the second set of mounting fasteners removably couple with the resilient support band.

Additional objects, advantages, and novel features of the invention will be set forth in part in the description which follows, and in part will become apparent to those skilled in the art upon examination of the following, or may be learned by practice of the invention.

FIGS. 1-6 depict various views of an exemplary HMDMA 100, a casual headwear piece 160, and a mounting element 152 secured to the casual headwear piece 160. More specifically, FIGS. 1-2 depict two different perspective views of an exemplary HMDMA 100, in accordance with aspects herein. The HMDMA 100 comprises a resilient support band 102 having an elongate shape that presents a first face 104 and a second face 106 opposite the first face 104. Additionally, the resilient support band 102 comprises a first portion 108 and a second portion 110 extending in opposite directions away from a central portion 112 of the resilient support band 102. The first portion 108 and second portion 110 can each have a corresponding collar protrusion 114 that present a first set of holes 118 aligned at a respective angle of approximately 2-3 degrees laterally away from the central portion 112 of the resilient support band 102.

The dimensions of the resilient support band 102 can vary depending on the size of the casual headwear piece 160. For example, a casual headwear piece 160 for a youth or child would require a shorter resilient support band 102 length than one that would be employed in an adult casual headwear piece. The length 170 of the resilient support band 102 is defined by an aggregate length of the first portion 108, second portion 110, and central portion 112 as shown in FIGS. 1 and 3. Further, within adult casual headwear pieces, there can be varying sizes of casual headwear pieces based on the style of headwear used and the size of the user's head. It is contemplated that the resilient support band 102 described herein can be manufactured in a variety of sizes in order to accommodate a wide range of casual headwear pieces. While the length 170 of the resilient support band 102 can vary, in some embodiments the length 170 of the resilient support band 102 can be between 450 millimeters and 500 millimeters, preferably about 479.425 millimeters for a standard adult-sized head. Additionally, the height 172 (shown in FIGS. 1 and 3) of the resilient support band 102 can vary based on the casual headwear piece 160 used, size of the headwear piece 160, and dimensions of an interior pocket (e.g., formed by a sweat band and inner crown surface) (seen, for example, in FIGS. 10-11 at 302) of the casual headwear piece 160. In some non-limiting embodiments, the height 172 should be no greater than 16 millimeters, preferably no greater than 15.875 millimeters. However, the height 172 can vary so that the resilient support band 102, when inserted into the interior pocket, does not protrude outward and comes in direct contact with the user (e.g., the user's forehead) when the headwear piece is worn. Similarly, the resilient support band 102's thickness 174 (shown in FIG. 3) can vary for the same reason the resilient support band 102 height 172 can vary. As such, in some non-limiting embodiments, the resilient support band 102's thickness 174 can be between 1.0 millimeter and 3.0 millimeters, but is preferably between 1.6 millimeters and 2.3 millimeters. Similarly, the thickness 174 can vary so that the resilient support band 102, when inserted into the interior pocket 302 (shown with an alternate resilient support band embodiment inserted in the casual headwear piece 300 of FIG. 3), does not cause too much inwardly pressure with the user's head when the headwear piece 160 is worn.

The resilient support band 102 can further comprise a pair of mounting elements 152, as seen in FIG. 3. The mounting elements 152 each include a mounting plate 120, a set of mounting plate fasteners 124, and a set of mounting plate nuts 132 configured to secure the mounting plate fasteners 124. It is contemplated that the mounting plate fasteners 124 and mounting plate nuts 132 can be formed from a non-metallic material, thereby providing greater resistance to corrosion over time than a metallic fastener. However, it is also contemplated that the mounting plate fastener 124 can be formed from or comprise a metal or alloy material.

In the illustrated embodiment of FIG. 1, each mounting plate 120 can include a first mounting component 128 and a second mounting component 130 that are removably attachable to a casual headwear piece 160 and the resilient support band 102 inserted into an interior pocket (e.g., formed by a sweat band and inner crown surface) (seen in FIG. 10 at 302) of the casual headwear piece 160. For example, in FIGS. 1-2, the mounting plate 120 shown with the first mounting component 128 can be a first mounting clip 128 and the second mounting component 130 can be a second mounting clip 130. In other embodiments, the mounting plate 120 can comprise a fastener or any other type of mounting element which would enable the mounting plate 120 to removably secure an HMDU, such as HMDU 400 seen in FIG. 12, to the casual headwear piece 160. Further, the mounting plate 120 also presents a second set of holes 126 that correspond to either of the presented first set of holes 118. Each of the mounting plates 120 described herein can be formed from one of injection molded polycarbonate, polyvinyl carbonate (PVC), and acrylonitrile butadiene styrene (ABS), by way of non-limiting example.

Figure 10:
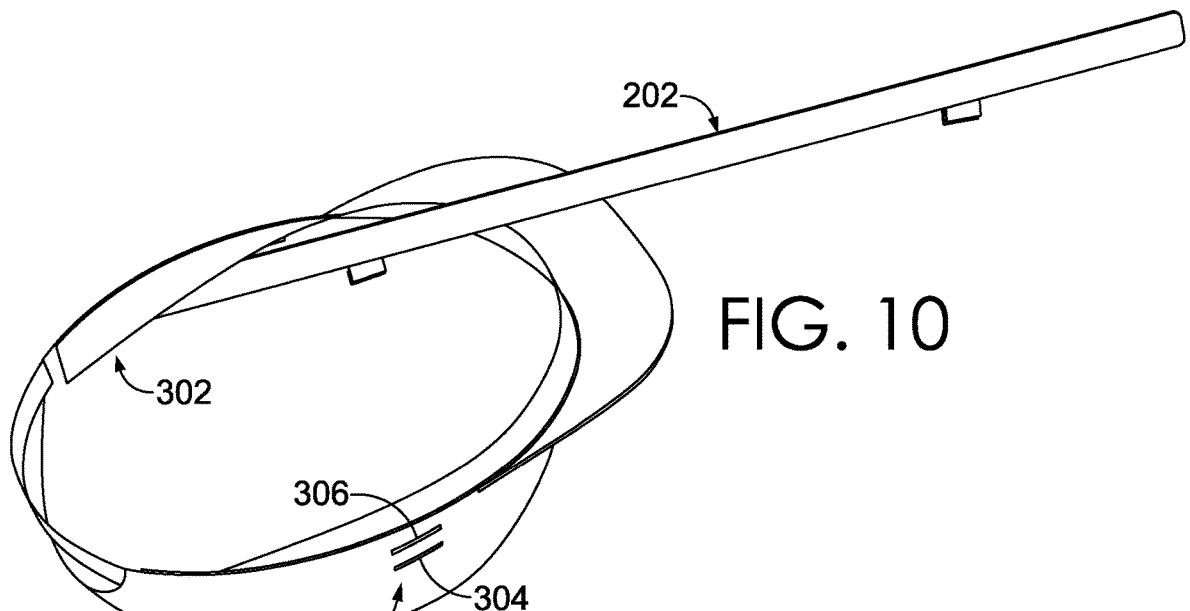
FIG. 10 depicts the resilient support band of FIG. 7 as it is inserted into an interior pocket of the causal headwear piece of FIG. 9, in accordance with aspects herein.
Figure 11:
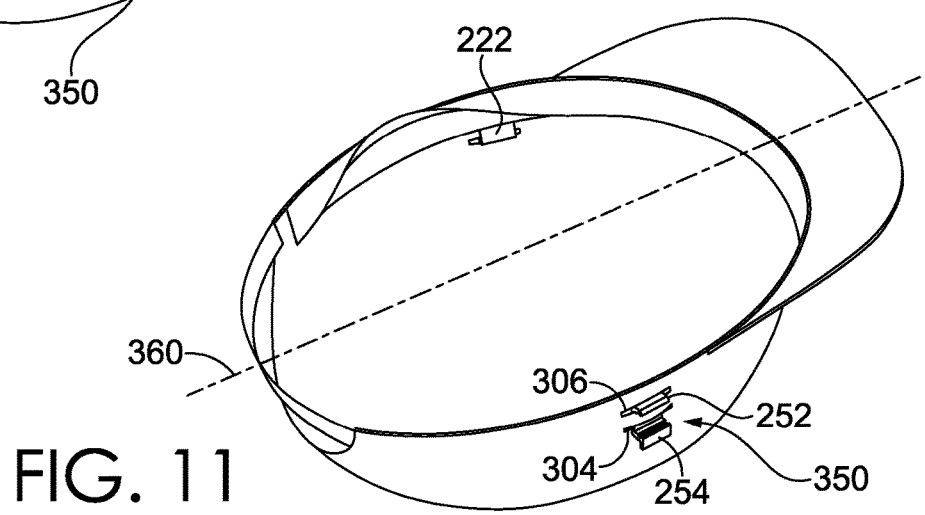
FIG. 11 depicts a bottom perspective view of the casual headwear piece of FIG. 9 with the resilient support band of FIG. 7 inserted into the interior pocket of the casual headwear piece, in accordance with aspects herein.
Figure 16:
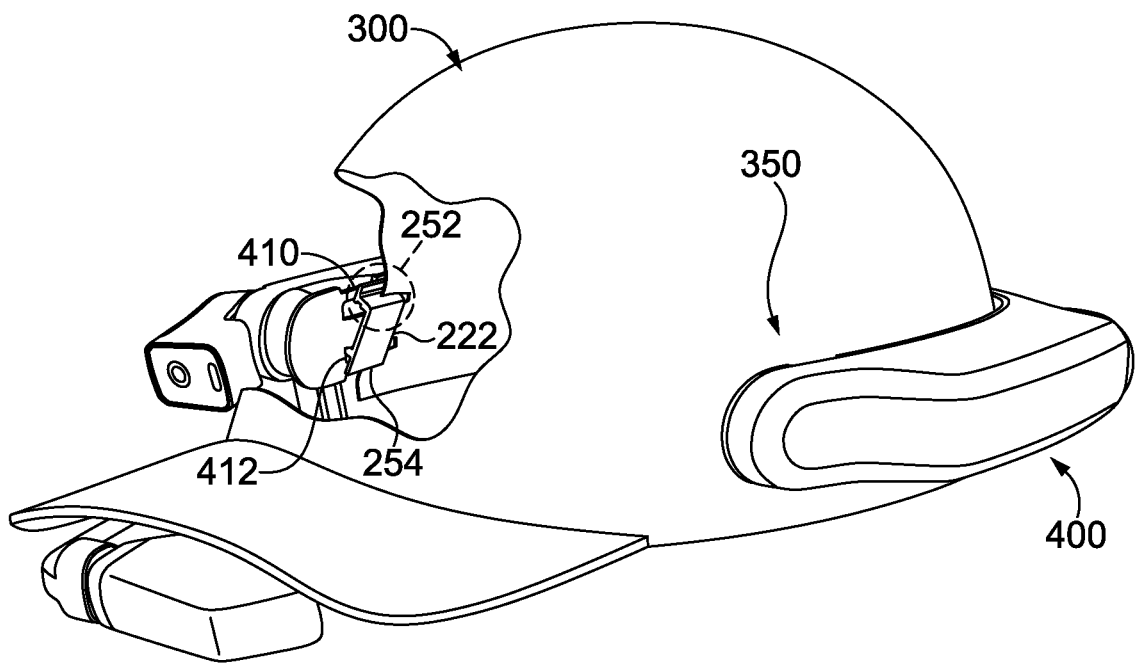
FIG. 16 depicts a perspective view of a mounting fastener of the resilient support band of FIG. 7 after it has been inserted through the material of the casual headwear piece but prior to the head mounting display unit being secured to the resilient support band, in accordance with aspects herein.
Figure 17:
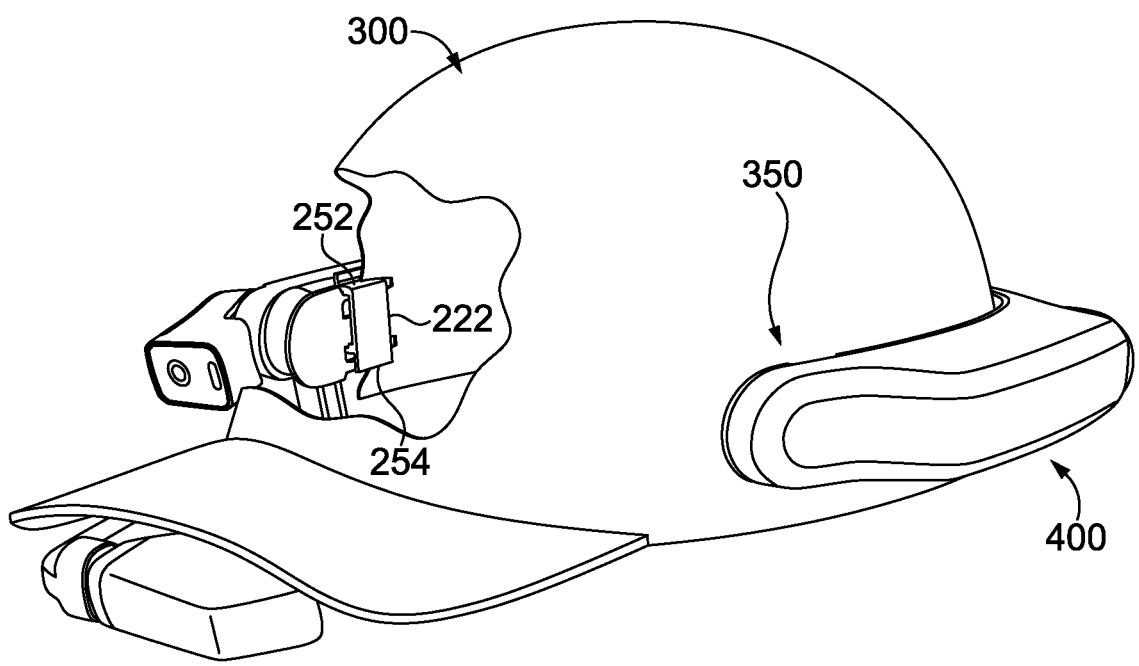
FIG. 17, depicts the perspective view of FIG. 16 wherein a head mounted display unit is secured to a casual headwear piece by the mounting fastener of the resilient support band of FIG. 7, in accordance with aspects herein.

Additionally, as seen in FIG. 4, the resilient support band 102 can be adapted to be flexed into a semi-circular configuration 180 for insertion into an interior pocket 302 (as seen in FIG. 11) of a casual headwear piece 160 (as seen in FIG. 10) such that the first set of holes 118 for each of the first portion 108 and second portion 110 are positioned at a respective temple region 350 (shown in FIGS. 12-17) of the casual headwear piece 160 (not shown). Further, the mounting plates 120 are adapted to be secured to both a casual headwear piece, such as the casual headwear piece 160 seen in FIG. 5, and the resilient support band 102. The sets of mounting plate fasteners 124 are first inserted through the presented first sets of holes 118 on the first portion 108 and second portion 110 of the resilient support band 102. Next, they are inserted through a material of the casual headwear piece 160 comprising a corresponding second set of holes 150 and secured to the mounting plates 120 by the mounting plate nuts 132. Once the mounting element 152 has been secured, the first and second mounting components 128 and 130 of the mounting plates 120 are further adapted to be removably secured to the HMDU 400 to the casual headwear piece 160 (as seen in FIGS. 16-17).

In some embodiments, the material of the casual headwear piece 160 can be manufactured to comprise the second set of holes 150 (seen in FIG. 5) corresponding to the first set of holes 118 of the first portion 108 and the second portion 110. The second set of holes 150 in the material of the casual headwear piece 160 can be constructed during the cut and sew process and can be configured similar to a buttonhole with stitching around the perimeter to prevent fraying. In this embodiment, the casual headwear piece 160 would be designed and manufactured with the second set of holes 150 to fit the mounting plate fasteners 124. By contrast, in other embodiments, the mounting plate fasteners 124 can be designed to puncture through the material of the casual headwear piece 160 upon assembly of the HMDMA 100. This would provide even greater flexibility with regard to use of the HMDU 400, as the HMDMA 100 could potentially be used in a wide scope of headwear pieces comprising various materials that do not have to be designed for specific use with the HMDU 400 and HMDMA 100. The material contemplated for the casual headwear piece 160 would be flexible, yet strong enough to withstand puncturing by the mounting plate fasteners 124 without resulting in fraying and other deterioration of the material.

Next, FIG. 3 illustrates an alternate perspective view of the exemplary head mounted display mounting assembly 100 of FIG. 1 in which the components of the pair of mounting elements 152 are removably secured together. As seen in FIG. 3, the mounting plate fasteners 124 have been inserted through the presented first set of holes 118 (not shown) on the resilient support band 102. The mounting plate nuts 132 have secured the mounting plate fasteners 124 on the first face 104 securing the components of the pair of mounting elements 152 together. While not show in in FIG. 3, and as previously described, after being inserted through the first set of holes 118 on the resilient support band 102, the mounting fasteners 124 are inserted through the second set of holes 150 on the material of the casual headwear 160 (either through openings created for the mounting fasteners 124 during manufacture of the casual headwear piece 160 or through openings created by the mounting fasteners 124 when inserted through the material of the headwear piece 160) and then the mounting plate 120 is secured, via the mounting plate nuts 132, to the mounting plate fasteners 124.

FIG. 4 depicts an alternate perspective view of the exemplary HMDMA 100 of FIG. 3 in which the resilient support band 102 can be flexed into a semi-circular configuration 180, in accordance with aspects herein. The resilient support band 102 can be flexed into a semi-circular configuration 180 so that it can be inserted into an interior pocket 302 of the casual headwear piece 160 (not shown). In aspects herein, the resilient support band 102 is formed from a high density polyethylene (HDPE). This material enables the resilient support band to remain rigid, yet flexible and also provide adequate support for the HMDU 400 once it is attached to the HMDMA 100. High density polyethylene is a polyethylene thermoplastic made from petroleum and is known for its large strength to density ratio, ranging from 0.93 to 0.97 g/cm$^3$. This provides the HDPE with stronger tensile strength then low density polyethylene, which results in greater resistance to breaking. This is important for the resilient support band 102, as the resilient support band 102 is flexed and must remain intact and resist breaking when inserted into the interior pocket 302 so that the HMDU 400 can be secured to the casual headwear piece 160 via the HMDMA 100.

FIG. 5 depicts the exemplary casual headwear piece 160 and one of the pair of mounting elements 152 prior to assembly, in accordance with aspects herein. The components of the pair of mounting elements 152, including the mounting plate 120, set of mounting plate fasteners 124 and mounting plate nuts 132 are shown. Additionally, FIG. 5 depicts the second set of openings 150 on the casual headwear piece 160 through which the sets of mounting plate fasteners 124 are inserted through and secured to the mounting plate 120 via the mounting plate nuts 132 prior to securement of the HMDU 400 (seen in FIG. 12) to the mounting plate 120.

Figure 6:
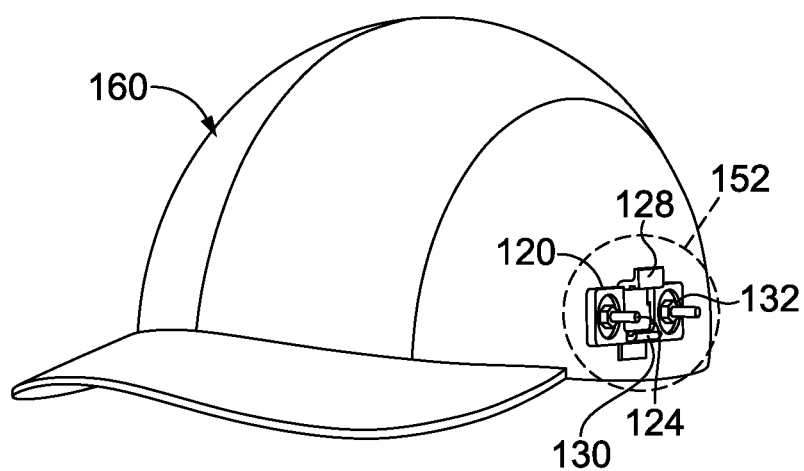
FIG. 6 depicts the exemplary head mounted display mounting assembly of FIG. 1 once it has been inserted through the material of the casual headwear piece of FIG. 5, in accordance with aspects herein.

FIG. 6 depicts the exemplary HMDMA of FIG. 1 secured to the casual headwear piece 160 prior to securement of the HMDU 400. As previously stated, the mounting plate 120 can further comprise a first mounting component 128 and a second mounting component 130 that will removably secure the HMDU 400 to the resilient support band 102 (not shown).

Next, FIGS. 7-8 depict an alternate exemplary head mounted display mounting assembly 200, in accordance with aspects herein. In this embodiment, the HMDMA 200 comprises a resilient support band 202 comprising first mounting element 204 and a second mounting element 206. The resilient support band 202 has an elongate shape that presents a first face 208 and a second face 210 oppose the first face 208. The elongate shape further include a top 212 and a bottom 214 opposite the top 212. The resilient support band 202 also comprises a length 260, height 270 and thickness 280. As previously mentioned, the dimensions of the resilient support band can vary depending on the size and type of casual headwear being utilized.

The first mounting element 204 can be secured to the first portion 216 of the resilient support band 202. The first mounting element 204 comprises a first set of mounting fasteners 222 that extend away transversely from the first face 208. Similarly, the second mounting element 206 can be secured to the second portion 218 of the resilient support band 202 and comprises a second set of mounting fasteners 224 that extend transversely away from the first face 208. As seen in FIG. 7, the mounting fasteners 222 and 224 are mounting clips that each further comprise a top clips 252 and 256 and a bottom clips 254 and 258 that will "snap" or couple to a top mounting point 410 and a bottom mounting point 412 (seen in FIGS. 16-17) of a HMDU 400. While FIG. 7 depicts the mounting fasteners 222 and 224 as being comprised of mounting clips, any type of fastener that would enable coupling to the HMDU 400 is contemplated herein, including, but not limited to a magnetic fastener and a Velcro fastener.

Additionally, in FIG. 7, the resilient support band 202 can be configured so that the top 212 and bottom 214 are parallel to one another and continuous from the first potion 216 to a center portion 220 and to the second portion 218 without any protrusions on the top 212 and bottom 214. However, in some embodiments, it is contemplated that the resilient support band 202 can comprise a protrusion, such a mounting tab that extends away from the top 212 or bottom 214 of the resilient support band 202. Such a tab or protrusion can be where the mounting element 204/206 can be secured to the resilient support band 202 and such a configuration can be designed in order to meet practical or aesthetic needs based on the type of casual headwear piece, user, or HMDU 400 being utilized.

The resilient support band 202 can be adapted to be flexed into a semi-circular configuration 250 for insertion into an interior pocket 302 of the casual headwear piece 300 (seen in FIG. 9), as shown in in FIG. 8. As previously mentioned, the resilient support band 202 can be comprised of high density polyethylene which provides it with high tensile strength, thereby resisting breaking when flexed into the semi-circular configuration 250 seen in FIG. 8. Once inserted into the interior pocket 302 of the causal headwear piece 300, the resilient support band 202 will remain in the semi-circular configuration 250 shown in FIG. 8 within the interior pocket 302 of the casual headwear piece 300. Each of the first and second set of mounting fasteners 222 and 224 will protrude through a respective openings (see FIG. 9 at 304 and 306) presented on a respect temple region of the casual headwear piece 300 (seen in FIG. 11). The resilient support band 202 can be then further adapted to be removably secure a HMDU 400 to the casual headwear piece 300 via the protruding first and second set of mounting fasteners 222 and 226.

It is contemplated that in other embodiments, the resilient support band 202 shown in FIG. 7 comprises a plurality of protrusions that extend away from the first surface 208 in the center region 220 and are configured to releasably couple to a strap located on a back region of a casual headwear piece 300 (not shown) such as a snapback hat. The strap located on the back of the snapback hat can comprise a set of apertures that correspond to the set of protrusions located on the central region 220 of the resilient support band 202. For example, on a snapback hat, which can be traditionally adjusted using two plastic pieces that snap together at the back in a variety of lengths, the resilient support band 202 that comprises a plurality of protrusions in the center region 220, that when inserted into an interior pocket 302 of a casual headwear piece 300 can releasably couple to a strap on the back of the snapback hat. When the resilient support band 202 and the strap are releasably coupled, the plurality of protrusions extending away from the first face of the resilient support band extend through each of the corresponding apertures on the strap of the casual headwear piece 300 securing the resilient support band 202 to the casual headwear piece 300.

Figure 9:
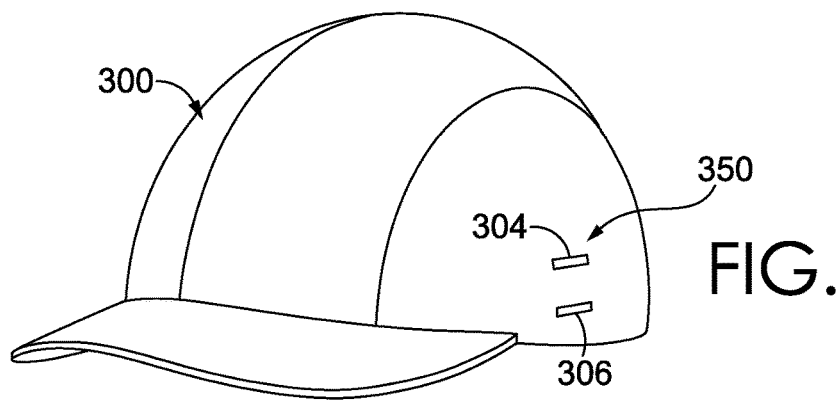
FIG. 9 depicts another exemplary casual headwear piece comprising openings configured to receive a set of mounting fasteners of the resilient support band of FIG. 7, in accordance with aspects herein.

Continuing with FIGS. 9-11, the casual headwear piece 300 and HMDMA 200 described inserted into the interior pocket 302 of the casual headwear piece 300 are shown, in accordance with aspects herein. FIG. 9 illustrates a sample casual headwear piece 300. In this embodiment, the casual headwear piece 300 depicted is a baseball hat, however, various other examples of casual headwear pieces, including visors, trucker caps, snapback hats, berets, and the like are contemplated herein. As seen in FIG. 9, the casual headwear piece 300 comprises two openings 304 and 306 configured to receive mounting fastener 222 of the resilient support band 202. More specifically, the top clip 252 and bottom clip 254 of mounting element 222 would be inserted through holes 304 and 306 of the casual headwear piece 300 and so that a HMDU 400 can be removably secured to the casual headwear piece 300 via the HMDMA 200.

While not shown in FIG. 9, the opposite side of the casual headwear piece 300 would similarly comprise two openings to receive the second mounting fastener 224 of the resilient support band 202. For example, when the resilient support band 202 is inserted into the interior pocket 302 of the casual headwear piece 300 (show in in FIG. 10), the first mounting fastener 222 of mounting element 204 secured to the first portion 216 of the resilient support band 202 will protrude through the openings 304 and 306 as shown in FIG. 9. The second mounting fastener 224 of mounting element 206 secured to the second portion 218 of the resilient support band 202 will protrude through a second set of openings on the opposite side of the casual headwear piece 300. The first and second set of mounting fasteners 222 and 224 are configured to protrude through the respective openings when the central portion of the resilient support band 202 is aligned with a center line 360 of the causal headwear piece 300 (as seen in FIG. 11). Following this, the resilient support band 202 can be further adapted to removably secure, through the mounting fasteners 222 and 224, a HMDU 400 to the casual headwear piece 300.

In this embodiment, the openings 304 and 306 in the casual headwear piece 300 will be formed during manufacture of the casual headwear piece 300 and are configured to fit the first and second set of mounting fasteners 222 and 224 through the openings 304 and 306. It is contemplated that in other embodiments, the HMDMA 200 can comprise a mounting element that is formed from a magnet, Velcro, or any other material that provides for securement of the HMDU 400 to the casual headwear piece 300 by the resilient support band 202.

As seen in FIG. 10, the resilient support band 202 can be inserted into the casual headwear piece 300 into an interior pocket 302 of the causal headwear piece 300. FIG. 11 depicts a bottom perspective view of the casual headwear piece 300 with the resilient support band 202 inserted into the interior pocket 302. The first mounting fastener 222 can be seen protruding through the respective openings 304 and 306 of the casual headwear piece 300. Further, as seen, the top clip 252 and bottom clip 254 of mounting fastener 222 extend away transversely from the casual headwear piece 300, protruding out of the holes 304 and 306 and are configured to "snap" onto a HMDU 400, thereby removably securing the HMDU 400 to the casual headwear piece 300.

Similarly, the second mounting element 224 would protrude through the openings on the opposite side of the casual headwear piece 300.

Figure 13:
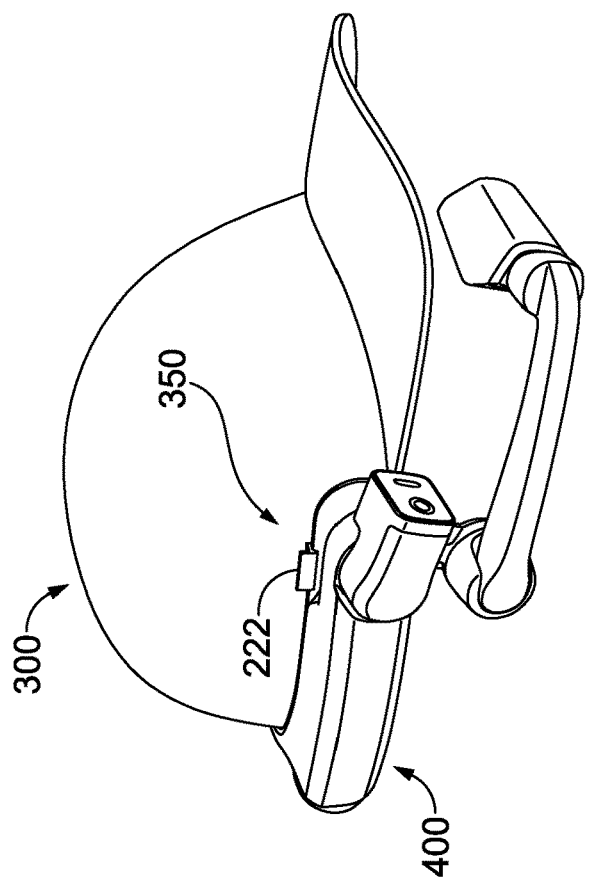
FIG. 13 depicts a side perspective view of the casual headwear piece of FIG. 9 with the exemplary head mounted display unit shown in in FIG. 12 secured to the casual headwear piece by the head mounted display mounting assembly of FIG. 7, in accordance with aspects herein.
Figure 12:
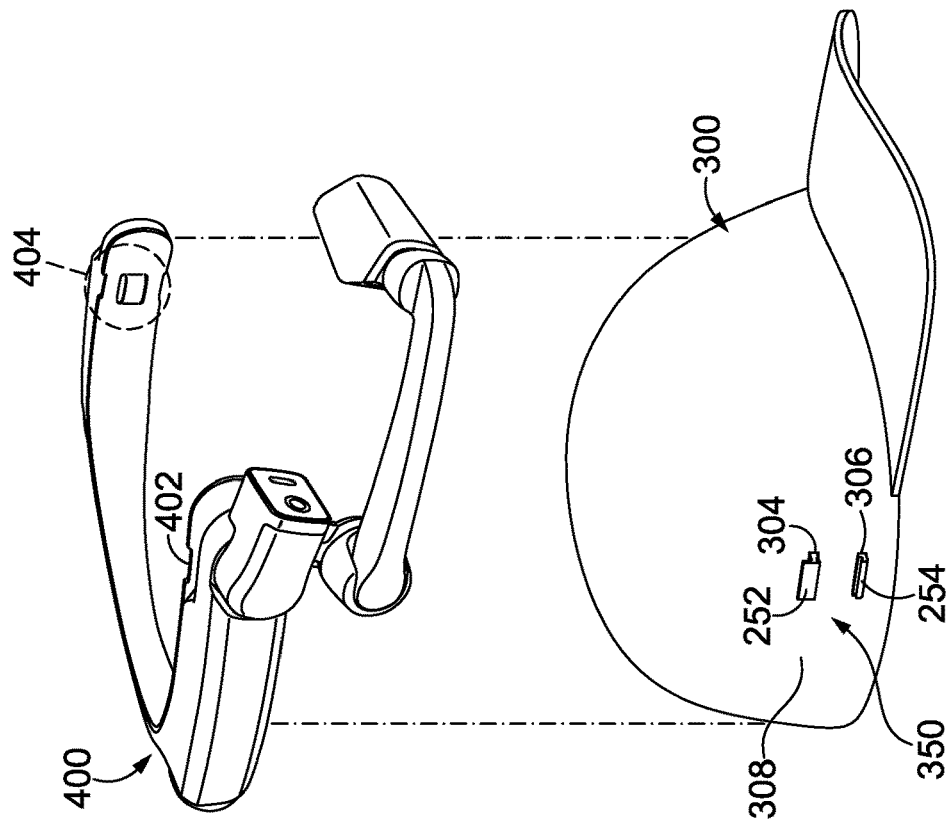
FIG. 12 depicts a side perspective view of the casual headwear piece of FIG. 9 with an exemplary head mounted display unit that is in position to be secured to the mounting fasteners of the resilient support band of FIG. 7, in accordance with aspects herein.
Figure 14:
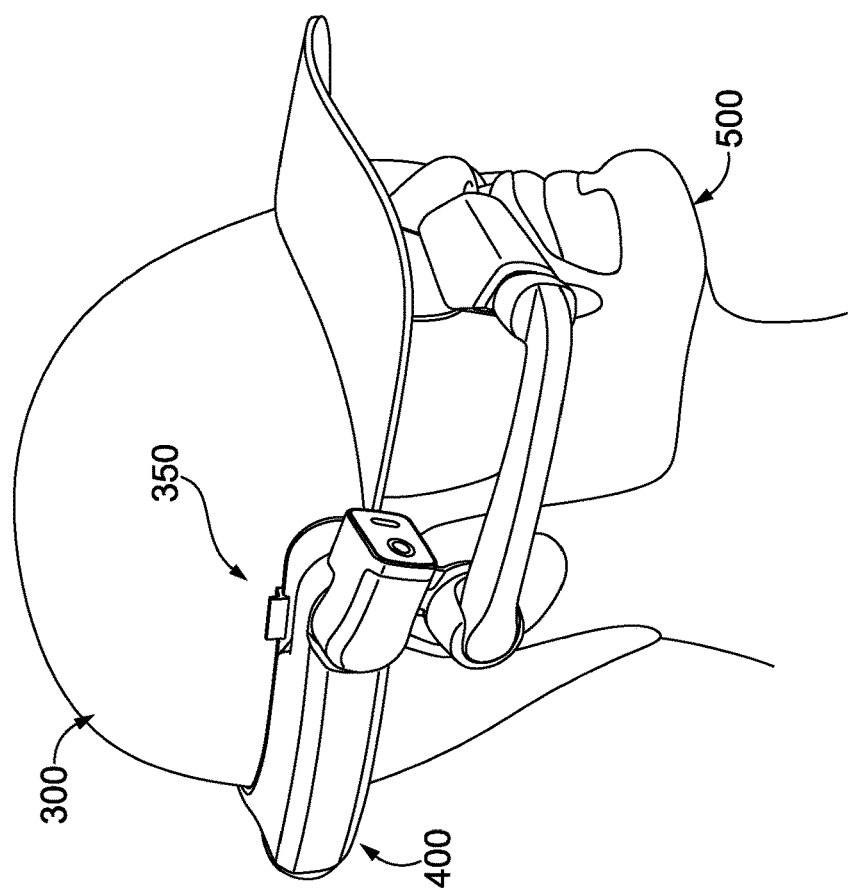
FIG. 14 depicts a side perspective view of a user wearing an exemplary casual headwear piece that has a head mounted display unit secured to it via the head mounted display mounting assembly of FIG. 7, in accordance with aspects herein.

Turning next to FIGS. 12-13, side perspective views of the HMDMA 200 (not shown) being utilized to removably secure a HMDU 400 to a casual headwear piece 300 is shown. FIG. 12 illustrates how the HMDU 400 will be positioned and secured to the casual headwear piece 300. In FIG. 12, the points of securement 402 and 404 on the HMDU 400 are shown. In this embodiment, the top clip 252 and bottom clip 254 of the first set of mounting fasteners 222 are seen protruding through the openings 304 and 306 on the causal headwear piece 300 and are positioned on a temple region 350 of the casual headwear piece 300. The HMDU 400, as shown, can be positioned so that the top clip 252 and bottom clip 254 of the first set of mounting fasteners 222 protruding through openings 304 and 304 will removably secure the HMDU 400 via the "snapping" or securement of the top clip 252 and the bottom clip 254 to the points of securement 402 and 404 on the HMDU 400. Similarly, on the opposite temple region 350 of the casual headwear piece 300, the top clip 256 and bottom clip 258 of the second set of mounting fasteners 224 (not shown) will protrude through the openings similar to 304 and 306 and removably secure the HMDU 400 to the casual headwear piece 300 at 404. FIG. 13 depicts the HMDU 400 removably secured to the casual headwear piece 300 utilizing the HMDMA 202 described herein. Further, FIG. 14 depicts the HMDU 400 removably secured to the casual headwear piece 300 that is worn by a user 500 and demonstrates how a HMDU 400 can be utilized with the casual headwear piece 500.

Figure 15:
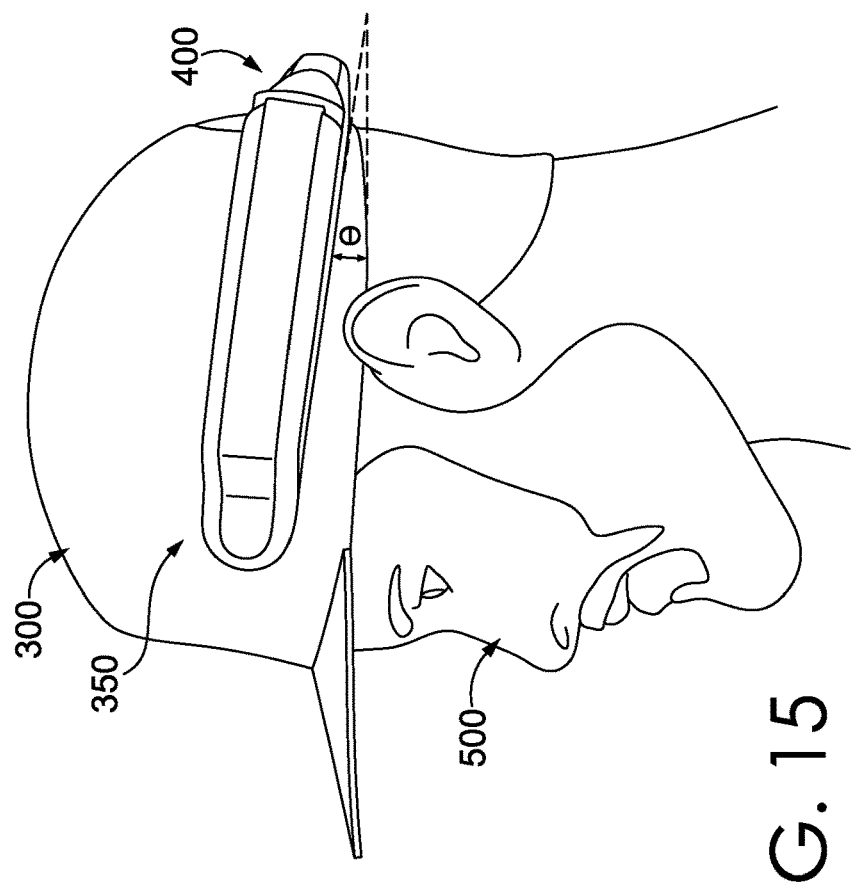
FIG. 15 depicts a side perspective view of a user wearing an exemplary casual headwear piece where an exemplary head mounted display unit is shown as being positioned at a slight angle above the ear of the user, in accordance with aspects herein.

FIG. 15 depicts a side perspective view of one side of the HMDU 400 removably attached to the casual headwear piece 300, in accordance with aspects herein. From FIG. 15, it can be seen that the HMDU 400 rests at a slight angle Θ so that the HMDU 400 does not rest or put pressure on the user's ear. This is achieved by positioning the first and second mounting fasteners 222 and 224 approximately 6-7 millimeters above the bottom 214 of the resilient support band 202. Further, the first and second mounting fastens 222 and 224 are canted approximately 2-3 degrees laterally to prevent the rear of the HMDU 400 from sagging onto or touching a user's ears.

Next FIGS. 16 and 17 depict perspective views of a mounting element 204 of the resilient support band 202, where the resilient support band 202 can be adapted to removably secure the HMDU 400 to the causal headwear piece 300. In both figures, a portion of the casual headwear piece 300 has been removed to show the removable securement of the HMDU 400 to the mounting element 204 of the resilient support band 202 after the resilient support band 202 is inserted into the interior pocket 302 of the casual headwear piece 300. In FIG. 16, the top clip 252 and bottom clip 254 of the first set of mounting fasteners 222 of the resilient support band 202 are shown just before the top clip 252 and bottom clip 254 "snap" onto a top mounting point 410 and a bottom mounting point 412 of the HMDU 400. FIG. 17 shows the top clip 252 and the bottom clip 254 of the first set of mounting fastener first 222 "snapped" onto to the HMDU 400, thereby removably securing the HMDU 400 to the casual headwear piece 300. While only the first set of mounting fasteners 222 are depicted in FIGS. 16-17, the second set of mounting fasteners 224 similarly comprise a top clip 256 and a bottom clip 258 (shown in FIG. 7) that "snap" the top mounting point and the bottom mounting point on the opposite temple region of the HMDU 400.

Figure 18:
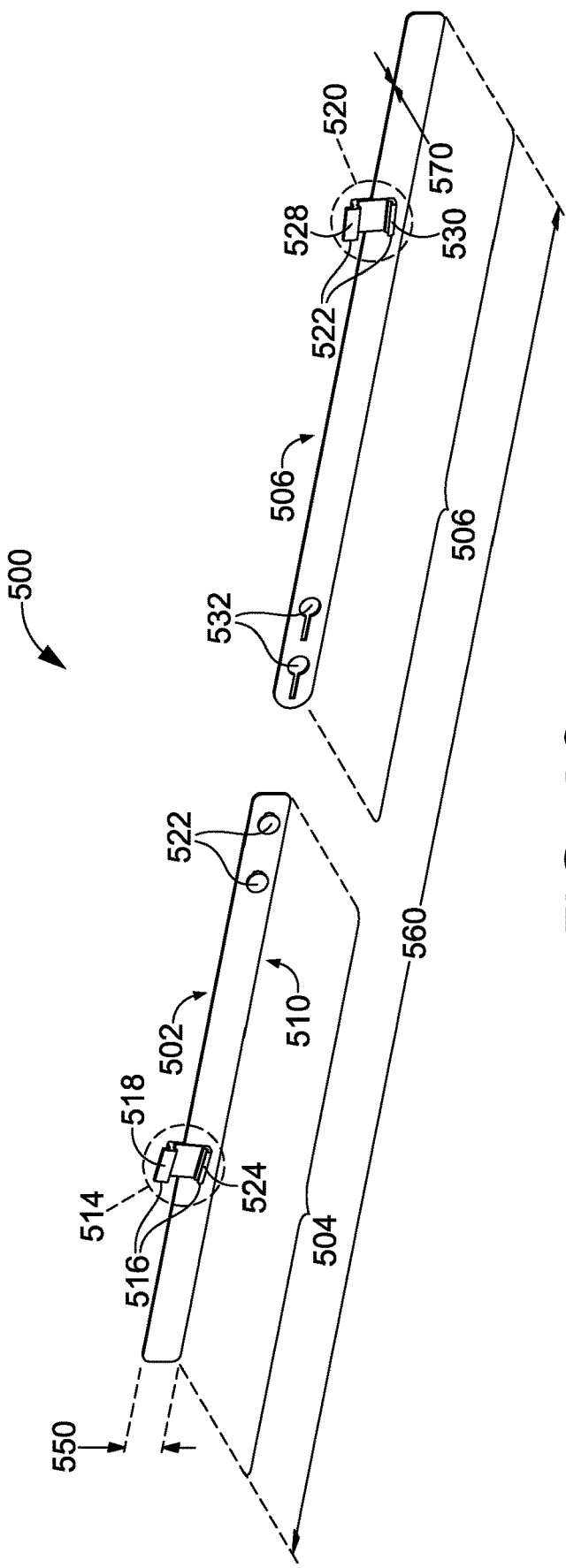
FIG. 18 depicts another alternate exemplary embodiment of a head mounted display mounting assembly, in accordance with aspects herein.

FIG. 18 depicts another alternate exemplary embodiment of a head mounting display assembly 500, in accordance with aspects herein. In FIG. 18, the head mounting display assembly 500 comprises a resilient support band 502 that is formed from a first portion 504 and a second portion 506 opposite the first portion 504, the first portion 504 and second portion are removably attached to one another. Similar to the other embodiments discussed herein, the resilient support band 502 comprises a length 560, a height 550 and a thickness 570. As mentioned previously, the dimensions of the resilient support band 502 may vary depending on the size of the casual headwear piece 300. Further, the resilient support band 202 described in FIG. 7, the resilient support band 502 comprises a first mounting element 514 secured to the first portion 504 of the resilient support band 502 and presenting a first set of mounting fasteners 516 that extend transversely way from a first face 510. A second mounting element 520 can be secured to the second portion 506 of the resilient support band 500 and presents a second set of mounting fasteners 522 that extend transversely away from a first face 510. Additionally, the first set of mounting fasteners 516 further comprise a top clip 518 and a bottom clip 524 and the second set of mounting fasteners 522 comprise a top clip 528 and a bottom clip 530. The resilient support band 500 can be also adapted to be flexed into a semi-circular configuration (not shown) similar to FIGS. 4 and 8 for insertion into an interior pocket 302 of a casual headwear piece 300 such that each of the first and second set of mounting fasteners 516 and 522 protrude through a respective opening on a respective temple region of the causal headwear piece. The inserted resilient support band 500 can be further adapted to secure a HMDU 400, via the protruding first and second set of mounting fasteners 516 522.

In the embodiment show in FIG. 18, the first portion 504 and the second portion 506 of the resilient support band 500 include one or more complimentary fasteners to detachably secure the first portion 504 to the second portion 506. Each complimentary fastener comprises a key 522 and a keyhole 532 where the first portion 504 and second portion 504 are removably attached when the keys 522 are inserted into the keyholes 532. This two-piece embodiment of the resilient support band 500 can provide further flexibility to be configured for a variety of casual headwear piece types and sizes.

Next, FIGS. 19-23 depict various views of another exemplary head mounted display mounting assembly 600, in accordance with aspects herein. In the embodiment seen in FIG. 19, the HMDMA 600 comprises a resilient support band 602, a first mounting element 604, and a second mounting element 606. The resilient support band 602 has an elongate shape that presents a first face 608 and a second face 610 oppose the first face 608. The elongate shape further includes a top 612 and a bottom 614 opposite the top 612. Additionally, the resilient support band 602 comprises a first portion 620 and a second portion 622 extending in opposite directions away from a central portion 624 of the resilient support band 602. The first portion 620 has a first mounting protrusion 626 that extends away from the top 612 of the first portion 620 of the resilient support band. The second portion 622 has a second mounting protrusion 628 that extends away from the top 612 of the second portion 622 of the resilient support band 602.

Figure 19:
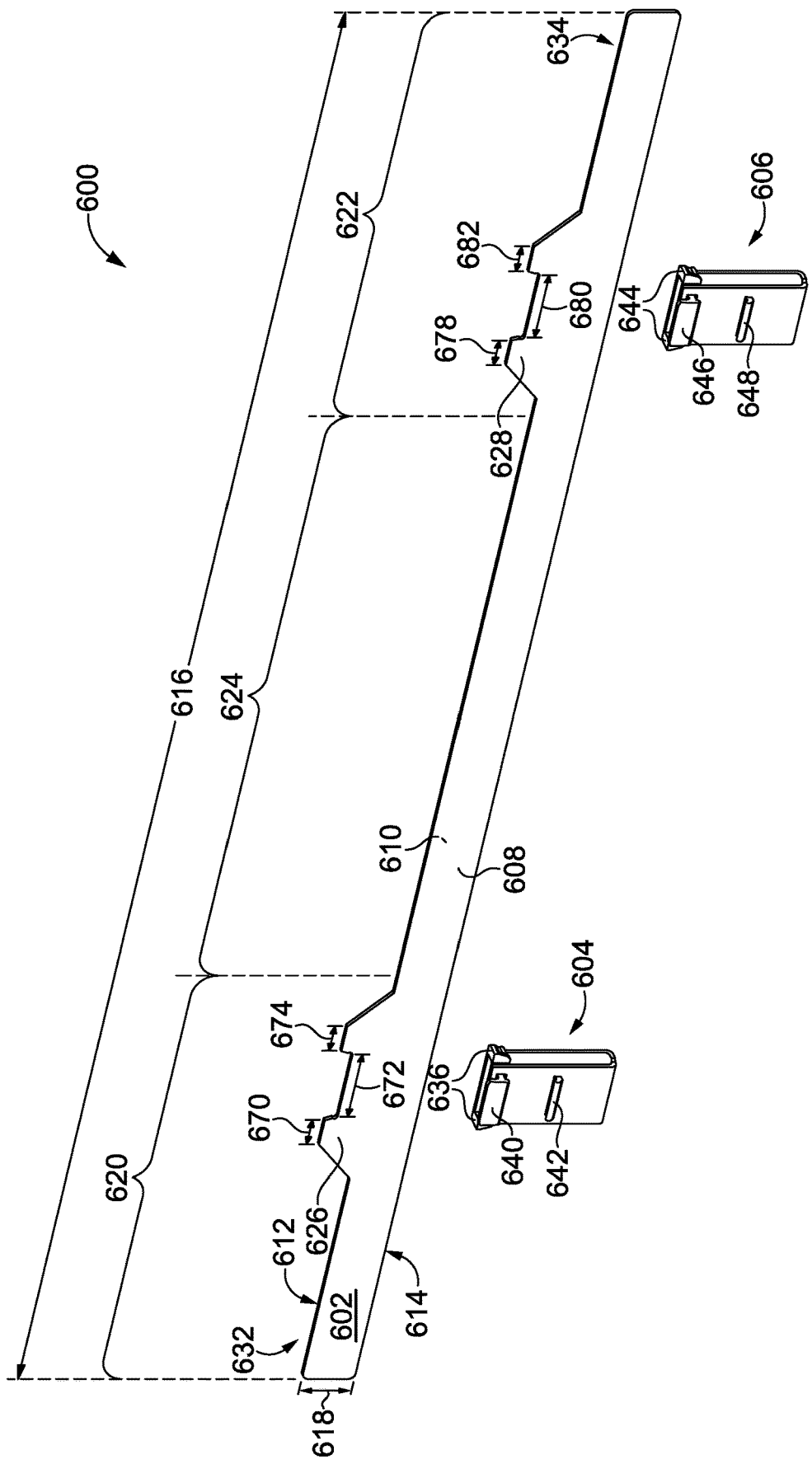
FIG. 19 depicts a perspective view of another exemplary embodiment of a head mounted display mounting assembly comprising a resilient support band, a first mounting element, and a second mounting element, in accordance with aspects herein.

As previously stated, the dimensions of the resilient support band 602 can vary depending on the size of the casual headwear piece (not shown). The length 616 of the resilient support band 602 is defined by an aggregate length of the first portion 620, second portion 622, and central portion 624 as shown in FIG. 19. It is contemplated that the resilient support band 602 described herein can be manufactured in a variety of sizes in order to accommodate a wide range of casual headwear pieces. Additionally, the height 618 of the resilient support band 602 can vary based on the casual headwear piece used, size of the headwear piece, and dimensions of an interior pocket (e.g., formed by a sweat band and inner crown surface). The height 618 can vary so that the resilient support band 602, when inserted into the interior pocket, does not protrude outward and comes in direct contact with the user (e.g., the user's forehead) when the headwear piece is worn. Additionally, at the first mounting protrusion 626 and second mounting protrusion 628, the height 618 of the resilient support band 602 is greater than the height 618 in the center portion 624, at a first end 632 of the first portion 620, and a second end 634 of the second portion 622. Similarly, the resilient support band 602's thickness 635 (shown in FIGS. 20 and 21) can vary for the same reason the resilient support band 602's height 618 can vary. Similarly, the thickness 635 can vary so that the resilient support band 102, when inserted into the interior pocket, does not cause too much inwardly pressure with the user's head when the headwear piece is worn.

Figure 20:
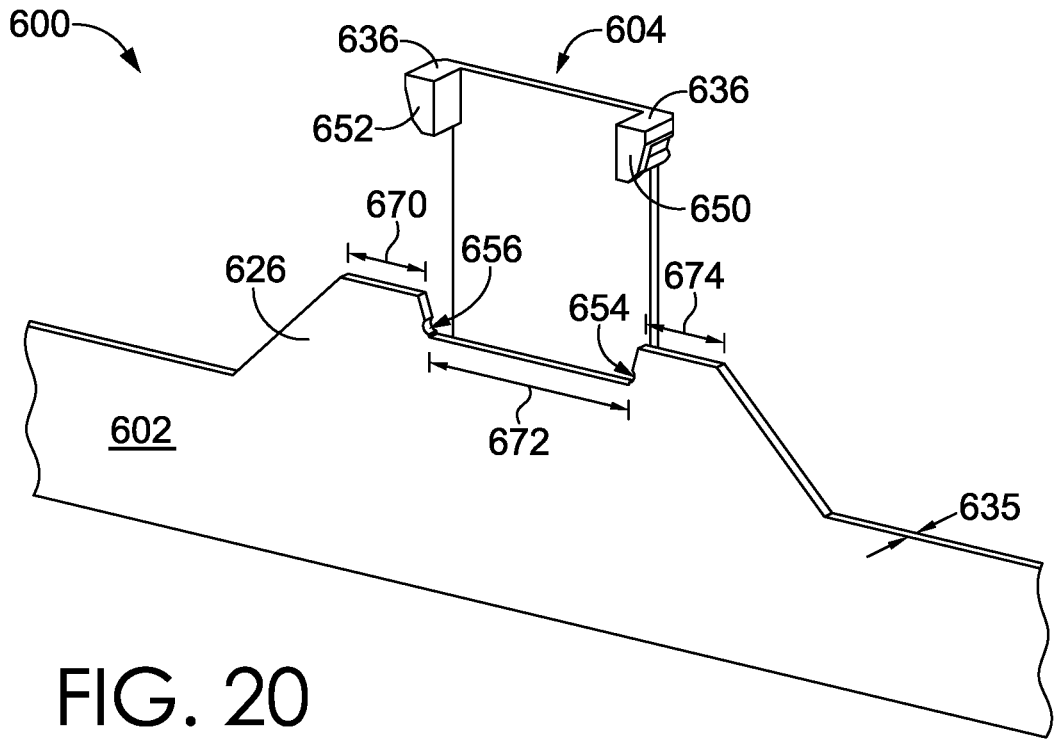
FIG. 20 depicts a perspective view of the exemplary head mounted display mounting assembly of FIG. 19 comprising a first mounting element prior to being removably secured to the resilient support band, in accordance with aspects herein.
Figure 21:
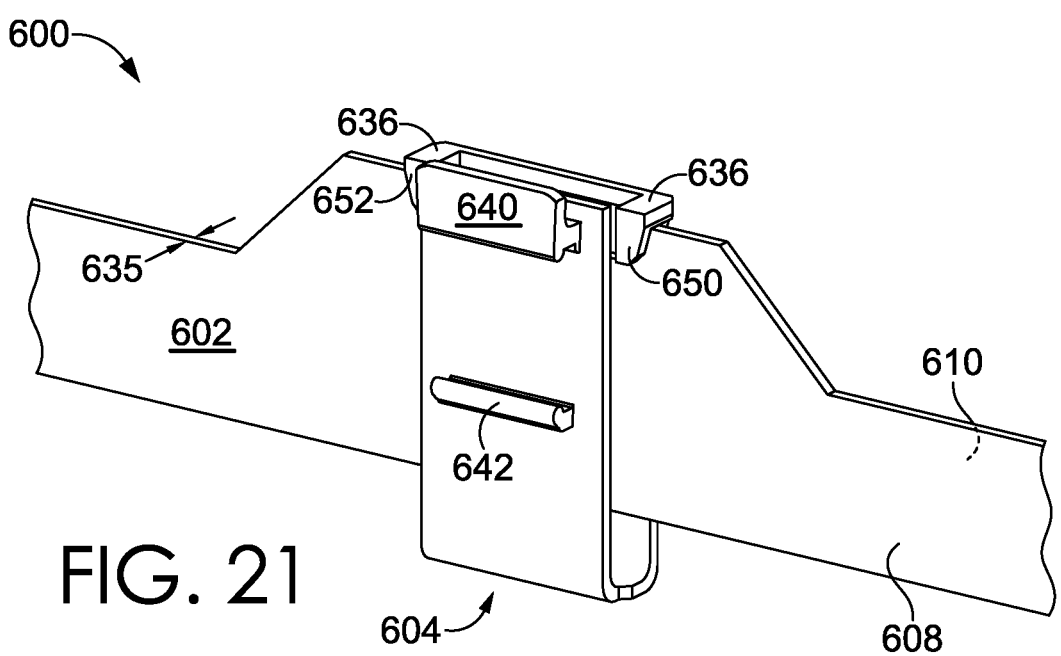
FIG. 21 depicts another perspective view of the exemplary head mounted display mounting assembly of FIG. 19 where the first mounting element that has been removably secured to the resilient support band, in accordance with aspects herein.

Additionally, the first mounting element 604 has a first set of mounting fasteners 636 as best seen in FIGS. 19-21. The first set of mounting fasteners 636 removably secure the first mounting element 604 to the resilient support band 602 at the first mounting protrusion 626. The first mounting element 604 also has a first set of head mounting display mounting clips ("mounting clips") 640 and 642 that extend transversely away from the first face 608 (seen in FIG. 21). Similarly, the second mounting element 606 has a second set of mounting fasteners 644 that removably secure the second mounting element 606 to the resilient support band 602 at the second mounting protrusion 628.

Further, the second mounting element 606 also has a second set of head mounting display mounting clips 646 and 648 that extend transversely away from the first face 608. The top mounting clips 640 and 646 and bottom mounting clips 642 and 648 each "snap" or couple to a top mounting point and a bottom mounting point of a HMDU (similar to the coupling of the top and bottom clips to the top mounting point 410 and a bottom mounting point 412 in FIGS. 16-17). While this embodiment depicts the mounting elements 604 and 606 as being comprised of mounting clips, any type of fastener that would enable coupling to the HMDU is contemplated herein, including, but not limited to a magnetic fastener and a Velcro fastener.

As described in previous embodiments, the resilient support band 602 can be adapted to be flexed into a semi-circular configuration (not shown) for insertion into a pocket of the casual headwear piece. As mentioned, the resilient support band 602 can be comprised of high density polyethylene which provides it with high tensile strength, thereby resisting breaking when flexed into the semi-circular configuration. Once inserted into the pocket of the causal headwear piece, the resilient support band 602 will remain in the semi-circular configuration within the pocket of the casual headwear piece. Each of the first mounting element 604 and second mounting element 606 are receivable by the pocket of the causal headwear piece after the resilient support band 602 is inserted into the pocket of the casual headwear piece such that the first set of mounting fasteners 636 and the second set of mounting fasteners 644 removably couple with the resilient support band 602.

FIG. 20 depicts a perspective view of the HMDMA 600 where the first mounting element 604 is positioned to be removably secured to the resilient support band 602 via the mounting fasteners 636. Additionally, as best seen in FIGS. 20 and 21, the first mounting fasteners 636 comprise a first projection 650 and a second projection 652. The first projection 650 and second projection 652 are configured so that when the first mounting element 604 is removably secured to the resilient support band 602, the first projection 650 and second projection 652 "snap" into a first complimentary groove 654 and a second complimentary groove 656 located on the first mounting protrusion 626. Similarly, the second mounting fasteners 644 comprise a third projection and a fourth projection (not shown) that also "snap" into a third complimentary groove and a fourth complimentary groove (not shown) located on the second mounting protrusion 628 of the resilient support band 602. The projections on the first and second mounting fasteners 636 and 644 and the complimentary grooves on the first and second mounting protrusions 626 and 628 are keyed so that they fit into the complimentary grooves, removably coupling the mounting elements 604 and 606 to the resilient support band 602.

Additionally, as shown in FIGS. 19 and 20, the first mounting protrusion 626 and second mounting protrusion 628 comprise a first portion 670, a second portion 674, and a third portion 672. The first portion 670 of the first mounting protrusion 626 and the third portion 674 of the first mounting protrusion 626 have equal heights 618 when measured from the top 612 to the bottom 614 of the resilient support band 602. The third portion 672 of the first mounting protrusion 626 has a height 618 that is less than the height 618 of the first portion 670 of the first mounting protrusion and the second portion 674 of the first mounting protrusion when measured from the top 612 to the bottom 614 of the resilient support band 602. The lower height 618 of the third portion of the first mounting protrusion provides for the area in which the first set of mounting fasteners 636 and more specifically, the first projection 650 and the second projection 652 snap into the first complimentary groove 652 and the second complimentary groove 656 of the first mounting protrusion 626 of the resilient support band 602, thereby removably securing the first mounting element 604 to the resilient support band 602. Similarly, as also seen in FIG. 19, the second mounting protrusion 628 also comprises a first portion 678, a second portion 682 and a third portion 680. Once again, the third portion 680's height 618 is less than the height 618 of the first portion 678 and second portion 682 when measured from the top 612 to the bottom 614 of the resilient support band 602.

FIG. 21 depicts the first mounting element 604 after the first projection 650 and second projection 652 have "snapped" into the first complimentary groove 654 and second complimentary groove 656 of the first mounting protrusion 626 to removably secure the first mounting element 604 to the resilient support band 602 at the first mounting protrusion 626. As can be seen, the first mounting element 604 has a u-shaped unitary body. FIG. 21 also depicts the first set of head mounted display mounting clips 640 and 642 that extend transversely away from the first face 608 of the resilient support band 602. After the resilient support band 602 is inserted into the pocket of a casual headwear piece and the first mounting element 604 is secured to the resilient support band 602, the mounting clips 640 and 642 are positioned to removably couple with a HMDU (not shown).

Figure 22:
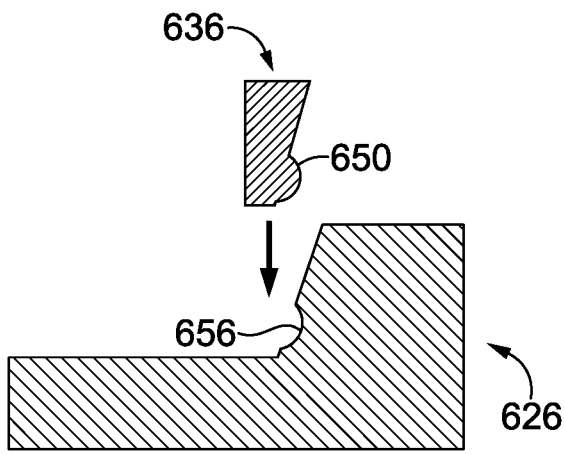
FIG. 22 depicts a projection of a mounting fastener located on a mounting element that is configured to snap into a complimentary groove located on a mounting protrusion of the resilient support band, in accordance with aspects herein.

FIG. 22 further illustrates the complimentary nature between the first projection 650 of the first mounting fastener 636 and the first complimentary groove 656 of the first mounting protrusion 626 of the resilient support band 602. As shown, the first projection 650 is configured so that when the first mounting element 604 is "snapped" into or removably secured to the resilient support band 602, the first projection 650 fits into the first complimentary groove 656. The "snap fit" results in a tension-like securement such that the first projection 650 will remain "locked" in place in the first complimentary groove 656 until enough pressure is applied to "unlock" or release the first projection 650 from the first complimentary groove 656 of the first mounting protrusion 626. The unlocking or releasing may occur via the application of manual pressure to release the first projection 650 from the first complimentary groove 656, thereby releasing the first mounting element 626 from the resilient support band 602. While not shown in FIG. 22, the second projection 652 of the first mounting element 604 and the third and fourth projections located on the second mounting element 606 are configured similarly to the first projection 650 and also "snap into" the corresponding complimentary grooves to provide for securement of the first mounting element 604 and second mounting element 606 to the resilient support band 602.

Figure 23:
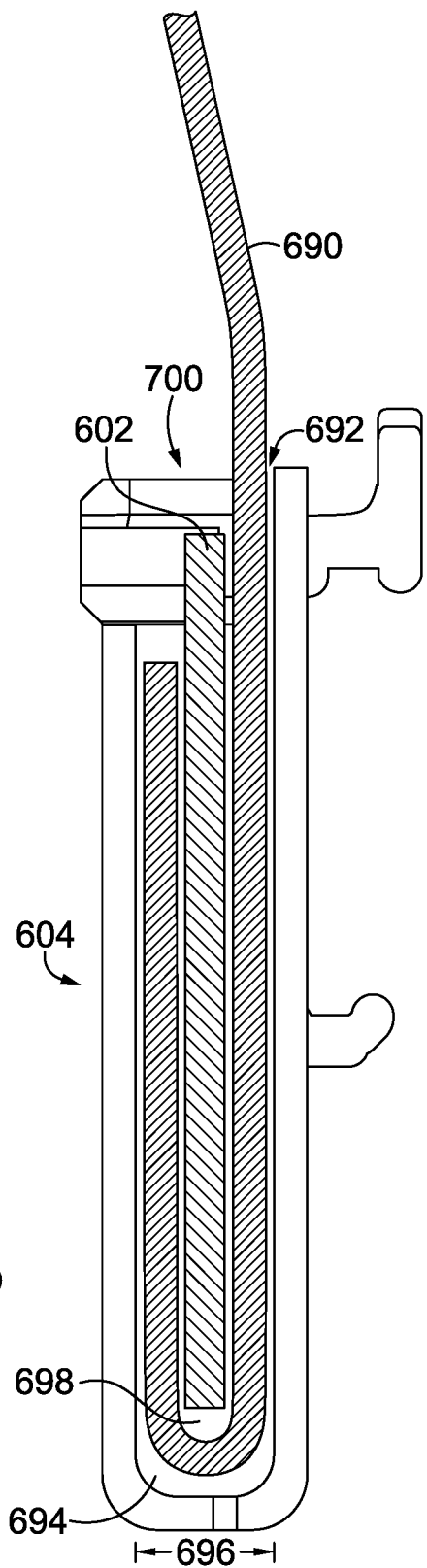
FIG. 23 illustrates a cross-sectional view of the head mounted display mounting assembly where the resilient support band has been inserted into a pocket of a casual headwear piece and the mounting element has been secured to the resilient support band, in accordance with aspects herein.

FIG. 23 depicts a cross-sectional view illustrating how the resilient support band 602 is inserted into a pocket 698 of a causal headwear piece 690 and the first mounting element 604 is removably secured to the resilient support band 602. The first mounting element 604 and second mounting element 606 are comprised of a rigidly flexible polymer material. This allows the first mounting element 604 and second mounting element 606 to flex so that the resilient support band 602 and causal headwear piece 690 can fit within the cavity 694 formed by the unitary body of the first mounting element 604 and second mounting element 606. As shown, the cavity 694 has a width 696 that is wide enough to allow for both the resilient support band 602 and the casual headwear piece 690 to fit within the cavity 694. Since the first and second mounting elements 604 and 606 are made of a rigidly flexible material, the mounting elements can flex to widen to allow for the resilient support band 602 and the causal headwear piece 690 to fit within the cavity 694.

Additionally, the pocket 698 of the casual headwear piece 690 is also shown in FIG. 23. As described, the resilient support band 602 is adapted to be flexed into a semi-circular configuration for insertion into the pocket 698 of the casual headwear piece 690. Further, the u-shaped unitary body of the first mounting element 604 shown in FIG. 23 and the second mounting element 606 (not shown) each comprise an opening 692 located at the top 700 of the first and second mounting elements 604 and 606. The flexibility of the first mounting element 604 and the second mounting element 606 allow for the opening 692 to widen or narrow as needed in order to fit the casual headwear piece 690 into the opening 692. As such, if the casual headwear piece 690 is made of a thicker material, the flexible nature of the material comprising the first and second mounting elements 604 and 606 will allow for the opening 692 to widen as needed to fit a thicker material through the opening 692. As previously mentioned, once the projections of the mounting fasteners snap into the complimentary grooves on the mounting protrusions 626 and 628, the resilient support band 602 will remain in place within the pocket of the casual headwear piece 690 until enough pressure is applied to "unlock" or release the projections from the complimentary grooves. Once the resilient support band 602 is inserted into the pocket 698 of the casual headwear piece 690 and the first and second mounting elements 604 and 606 are removably secured to the resilient support band 602, the HMDMA 600 is ready for securement to a HMDU via the mounting clips 640, 642, 646, and 648 located on the first and second mounting elements 604 and 606.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and sub combinations are of utility and can be employed without reference to other features and sub combinations. This is contemplated by and is within the scope of the invention.

In the preceding detailed description, reference is made to the accompanying drawings which form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments can be practiced with only some of the described aspects. For purposes of explanation, specific numbers, materials, and configurations are set forth in order to provide a thorough understanding of the illustrative embodiments. However, it will be apparent to one skilled in the art that alternate embodiments can be practiced without the specific details. In other instances, well-known features have been omitted or simplified in order not to obscure the illustrative embodiments.

The phrase "in one embodiment" or "in an embodiment" is used repeatedly. The phrase generally does not refer to the same embodiment; however, it may. The terms "comprising," "having," and "including" are synonymous, unless the context dictates otherwise.

What is claimed is:

1. A head mounted display mounting assembly unit (HMDU) for casual headwear, comprising:
    a resilient support band having an elongate shape that presents a first face and a second face opposite the first face, a top, a bottom opposite the top, a first portion and a second portion extending in opposing directions away from a central portion of the resilient support band, a first mounting protrusion extending away from the top of the first portion of the resilient support band, and a second mounting protrusion extending away from the top of the second portion of the resilient support band,
    a first u-shaped mounting element having a first set of mounting fasteners comprising a first projection and a second projection that removably secure the first u-shaped mounting element to the resilient support band by coupling the first projection to a first complimentary groove and the second projection to a second complimentary groove located on the first mounting protrusion, and a first set of head mounted display mounting clips extending transversely away from the first face, the first set of head mounted display mounting clips comprising a top mounting clip and a bottom mounting clip wherein the top mounting clip couples to a first top mounting point and the bottom mounting clip couples to a first bottom mounting point on an HMDU; and a second u-shaped mounting element having a second set of mounting fasteners comprising a third projection and a fourth projection that removably secure the second u-shaped mounting element to the resilient support band by coupling the third projection to a third complimentary groove and the fourth projection to a fourth complimentary groove located on at the second mounting protrusion, and a second set of head mounted display mounting clips extending transversely away from the first face, the second set of head mounted display mounting clips comprising a top mounting clip and a bottom mounting clip, wherein the top mounting clip couples to a second top mounting point and the bottom mounting clip couples to a second bottom mounting point on the HMDU, wherein the resilient support band is adapted to be flexed into a semi-circular configuration for insertion into a pocket of the casual headwear piece, and the first u-shaped mounting element and the second u-shaped mounting element are receivable by the pocket after the resilient support band is inserted into the pocket of the casual headwear piece such that the first set of mounting fasteners and the second set of mounting fasteners removably couple with the resilient support band.

2. The head mounted display mounting assembly of claim 1, wherein first and second mounting protrusions further comprise a first portion, a second portion, and a third portion.

3. The head mounted display mounting assembly of claim 2, wherein the first and second portions have a height greater than a height of the third portion when measured from the top to the bottom of the resilient support band.

4. The head mounted display mounting assembly of claim 3, wherein the first portion and the second portion have the same height when measured from the top to the bottom of the resilient support band.

5. The head mounted display mounting assembly of claim 1, wherein the top and bottom clips are configured to removably attach to respective top and bottom portions of the head mounted display unit.

6. A head mounted display mounting assembly for casual headwear, comprising:
 a resilient support band having an elongate shape that presents a first face and a second face opposite the first face, a top, a bottom opposite the top, a first portion and a second portion extending in opposing directions away from a central portion of the resilient support band, a first mounting protrusion comprising a first set of complimentary grooves and extending away from the top of the first portion of the resilient support band, and a second mounting protrusion comprising a second set of complimentary grooves and extending away from the top of the second portion of the resilient support band, a first u-shaped mounting element having a first set of mounting fasteners comprising a first set of opposing projections that removably snap into and secure the first mounting element to the resilient support band at the first set of complimentary grooves on the first mounting protrusion, and a first set of head mounted display mounting clips extending transversely away from the first face wherein the first set of head mounted display mounting clips comprises a top mounting clip that couples to a first top mounting point and a bottom mounting clip that couples to a first bottom mounting point on a HDMU; and a second u-shaped mounting element having a second set of mounting fasteners comprising a second set of opposing projections that removably snap into and secure the second mounting element to the resilient support band at the second set of complimentary grooves on the second mounting protrusion, and a second set of head mounted display mounting clips extending transversely away from the first face wherein the second set of head mounted display mounting clips comprises a top mounting clip that couples to a second top mounting point and the bottom mounting clip couples to a second bottom mounting point on the HMDU, wherein the resilient support band is adapted to be flexed into a semi-circular configuration for insertion into a pocket of the casual headwear piece, and the first mounting element and the second mounting element are receivable by the pocket after the resilient support band is inserted into the pocket of the casual headwear piece such that the first set of mounting fasteners and the second set of mounting fasteners removably couple with the resilient support band.

7. The head mounting display mounting assembly of claim 6, wherein the first and second mounting elements are comprised of a rigidly flexible polymer material.

8. The head mounted display mounting assembly of claim 6, wherein the resilient support band is comprised of a high density polyethylene (HDPE).

9. The head mounted display mounting assembly of claim 8, wherein the resilient support band has greater flexibility than the first and second mounting elements.

10. The head mounted display mounting assembly of claim 6, wherein a u-shaped unitary body of the first and second mounting elements further comprises an opening at the top of the first and second mounting elements.

11. The head mounted display mounting assembly of claim 10, wherein the opening at the top of the first and second mounting elements has a flexible width to allow for the resilient support band and casual headwear piece to be inserted into a cavity within the u-shaped body of the first and second mounting elements.

* * * * *